Dec. 16, 1941.  M. P. BLOMBERG  2,266,304
RAILWAY BRAKE RIGGING
Original Filed June 12, 1939

Inventor
Martin P. Blomberg
By
Attorneys

Patented Dec. 16, 1941

2,266,304

UNITED STATES PATENT OFFICE 2,266,304

RAILWAY BRAKE RIGGING

Martin P. Blomberg, Hinsdale, Ill., assignor to General Motors Corporation, Detroit, Mich., a corporation of Delaware Original application June 12, 1939, Serial No. 278,719. Divided and this application May 29, 1941, Serial No. 395,842

7 Claims. (Cl. 188—56)

This application is a division of my copending application, Serial No. 278,719, filed June 12, 1939, Patent No. 2,246,340, June 17, 1941.

This invention relates to improvements in brake rigging for railway vehicles, and has for its object the provision of such a construction which will be simpler and lighter in weight than those which have preceded it, and which therefore will be more economical to produce.

Another object of the invention is to devise the rigging so that it may be easily taken apart and put back together again, whenever repairs or replacement of parts is necessary, regardless of how long it has been in service.

Other objects and advantages of the invention will be apparent upon reference to the specification and accompanying drawing, in which.

Figure 1:
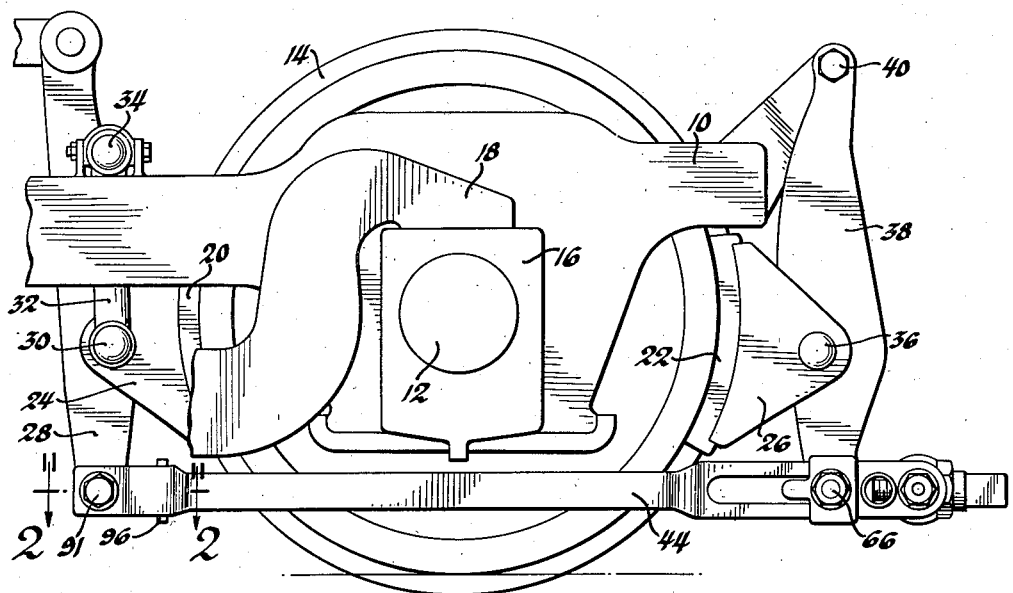
Fig. 1 is a side view of a portion of a railway vehicle truck showing one of the wheels and my improved brake rigging associated therewith.

The reference numeral 10 indicates the frame of a railway vehicle truck, in which the axle 12 carrying the wheels 14 is journalled in the usual manner in journal boxes 16, and 18 is an equalizer bar, the ends of which rest on top of the journal boxes. The brake arrangement shown is of the well-known clasp type, and consists of brake shoes 20 and 22 adapted to be forced against the opposite sides of the wheel, the shoes being supported upon brake heads 24 and 26. The brake head 24 is pivotally connected to a live truck lever 28 at 30, and is supported by a pair of hangers 32 which are pivotally secured to the truck frame at 34, while the brake head 26 is pivotally connected at 36 to a dead truck lever 38, which is pivotally supported at 40 on the truck frame. The lower ends of the levers 28 and 38 are connected together by a pair of tension rods 42 and 44 which extend on opposite sides of the wheel, the lever 38 being connected to the rods by a bolt 66 and the associated slack adjusting structure disclosed in my pending application referred to above.

Figure 2:
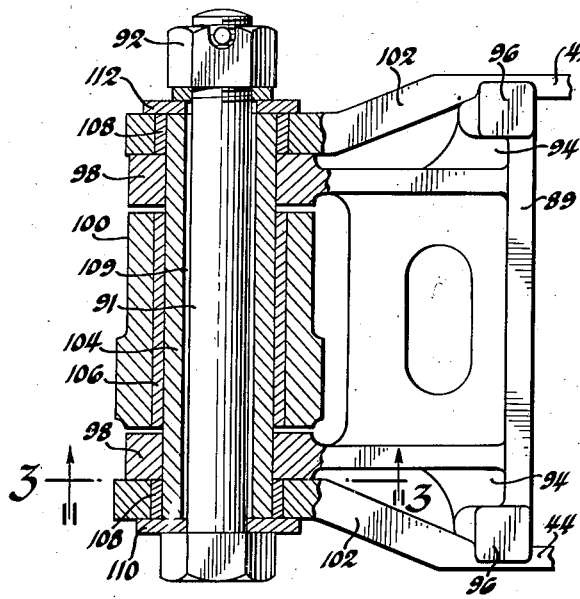
Fig. 2 is a sectional view taken on the line 2—2 of Fig. 1, showing the parts on a somewhat larger scale.
Figure 3:
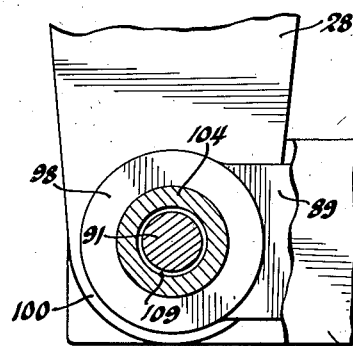
Fig. 3 is a sectional view taken on the line 3—3 of Fig. 2.

The lever 28 is connected to the tension rods by the structure illustrated in Figs. 2 and 3, wherein the ends of the tension rods are held in proper spaced relation to each other by means of a bridging member 89 and a bolt 91 and nut 92, the latter being threaded onto the bolt. At the end adjacent the wheel 14, the bridging member is made relatively wide by having projections 94 formed on it, against which projections the tension rods bear, there being flanges 96 formed on the top and bottom portions of the projections, which flanges extend over the upper and lower edges of the tension rods to hold the bridging member in proper relation to the rods. At its opposite end, the bridging member has spaced apart lugs 98 formed on it, and a boss 100 formed integral with or secured to the lower end of the live truck lever 28 is received in the space between the lugs 98. It will be seen from Fig. 2 that since the outer faces of the lugs 98 are closer together than are the faces of the projections 94, the tension rods are offset at at 102 to permit them to bear against the lugs. The purpose of this is to allow the use of as short a bolt as possible to obtain clearance between it and adjacent parts, and to decrease the weight since these bolts are quite large and are therefore relatively heavy, and to lower the expense since these bolts are specially machined and their cost is in proportion to their size.

If conventional practice has been followed in designing this construction, the holes in the tension rods, the lugs and the boss through which the bolt 91 extends would have been made only slightly larger in diameter than the diameter of the body portion of the bolt, in order that there might be as little play or lost motion between the parts as possible. While such a construction is satisfactory when new, the brake rigging must be taken apart and put back together again several times during its life, and it has been found that after it has been in service for a time, the bolts used to hold the tension rods in place become so corroded that it is only with great difficulty that they may be removed from the parts they pass through, it very frequently being necessary to drive them out with a sledge hammer. This is objectionable since it increases greatly the labor cost of disassembling the brake rigging, and also because quite often the ends of the bolts are so damaged by the hammering upon them that they cannot be used again, and must be replaced, and as pointed out above, being specially machined they are quite expensive so this is a serious objection.

Therefore, instead of having the bolt 91 fit directly into the parts it passes through, I form larger holes in the tension rods, the lugs 98 and the boss 100, and provide a sleeve 104 which extends through these holes and terminates substantially flush with the outer faces of the tension rods at the point where the bolt 91 passes through the rods. The diameter of the holes in the lugs 98 is made substantially the same as the outside diameter of the sleeve, so that the latter is a light press fit in the lugs. A bushing 106 pressed into the boss 100 has its inside diameter slightly larger than the outer diameter of the sleeve so that the lever 28 may be free to rotate with respect to the sleeve, while bushings 108 pressed into the holes in the rods 42 and 44 have their inside diameters enough larger than the outer diameter of the sleeve to permit easy assembly upon or removal from the latter. The diameter of the hole in the sleeve is enough larger than the diameter of the body portion of the bolt to insure that there will be a substantial clearance 109 between the bolt and the sleeve at all times to permit easy removal of the bolt from within the sleeve. In other words, the clearance is such that even if the bolt should become badly corroded, it still could be driven out of the hole in the sleeve without requiring any heavy hammering upon it which might damage it. A washer 110 is placed between the head of the bolt and the rod 44, while another washer 112 is placed between the nut 92 and the rod 42. When the nut is tightened, the washers are drawn against the faces of the rods 42 and 44 thereby firmly holding the bolt in position in the sleeve so that there can be relative movement between the two in spite of the substantial clearance between them, and since the tension rods, the lugs 98 or the boss 100 cannot move relative to the sleeve because of the small clearance between them and the sleeve, there can be no play or lost motion between any of the parts, and therefore no vibration or rattling noises can develop at this point, while at the same time the parts may be easily disassembled regardless of how long they have been in service.

While I have shown and described a specific embodiment of my invention, it will be understood that various changes in the details of the structure may be made without departing from the spirit and scope of the appended claims.

I claim:

1. In a brake rigging, the combination of a pair of tension rods, a bridging member located between the rods at one end thereof and adapted to hold them in spaced relation to each other, a sleeve passing through aligned holes formed in the bridging member and in the tension rods, a brake lever journalled on the outside of the sleeve, and means extending through the sleeve and adapted to hold the assembly together.

2. In a brake rigging, the combination of a pair of tension rods, a bridging member located between the rods at one end thereof and spacing them apart, a cylindrical sleeve extending through aligned holes formed in the bridging member and in the ends of the tension rods, a brake lever having a portion thereof rotatably mounted on the outside of the sleeve, a bolt extending through the inside of the sleeve, and a nut in threaded engagement with the end of the bolt, said bolt and nut being adapted to hold the structure in assembled relation to each other.

3. In a brake rigging, the combination of a pair of tension rods, a bridging member located between the rods at one end thereof and spacing them apart, said member having a pair of spaced apart lugs formed thereon, a sleeve extending through aligned holes formed in the lugs and in the ends of the tension rods, a brake lever having a portion thereof located in the space between the lugs, said portion being rotatably mounted on the outside of the sleeve, and means extending through the sleeve and adapted to hold the assembly together.

4. In a brake rigging, the combination of a pair of tension rods, a bridging member located between the rods adjacent one end thereof and holding them in spaced relation to each other, said member having a pair of spaced apart lugs formed thereon, a cylindrical sleeve extending through holes formed in said lugs and in the ends of the tension rods, a brake lever having a portion thereof located in the space between said lugs, said portion being rotatably mounted on the outside of the sleeve, a bolt extending through the inside of the sleeve, and a nut in threaded engagement with the end of the bolt, said bolt and nut being adapted to hold the structure in assembled condition.

5. In a brake rigging, the combination of a pair of tension rods, a bridging member located between the rods adjacent one end thereof and serving to hold them in spaced relation to each other, a sleeve extending through aligned holes formed in the bridging member and in the ends of the tension rods, a brake lever journalled on the outside of the sleeve, and means extending through the sleeve and adapted to hold the assembly together, said means being substantially smaller in external diameter than the inside diameter of the sleeve so that it may be easily removed to permit disassembly of the parts.

6. In a brake rigging, the combination of a pair of tension rods, a bridging member located between the rods adjacent one end thereof and serving to hold them in spaced relation to each other, a sleeve extending through aligned holes formed in the bridging member and in the ends of the tension rods, a brake lever having a portion thereof rotatably mounted on the outside of the sleeve, a bolt extending through the inside of the sleeve, the external diameter of the body portion of the bolt being enough smaller than the internal diameter of the sleeve to permit the bolt to be easily removed from within or inserted into the sleeve under all conditions, and a nut in threaded engagement with the end of the bolt, said nut when tightened being adapted to hold the structure in assembled relation and to prevent movement of the bolt relative to the sleeve.

7. In a brake rigging, the combination of a pair of tension rods, a bridging member located between the rods adjacent one end thereof and serving to hold them in spaced relation to each other, said member having a pair of spaced apart lugs formed thereon, a cylindrical sleeve extending through holes formed in said lugs and in the ends of the tension rods, a brake lever having a boss secured to the lower end thereof, said boss being located in the space between the lugs and being rotatably mounted on the outside of the sleeve, a bolt extending through the inside of the sleeve, the external diameter of the body portion of the bolt being enough smaller than the internal diameter of the sleeve to insure that there will be a substantial clearance between the two under all conditions, a nut in threaded engagement with the end of the bolt, a washer located between the head of the bolt and the adjacent tension rod, and a second washer located between the nut and the other tension rod, said washers being larger in diameter than the diameter of the sleeve so that when the nut is tightened, the washers will be drawn against the outer faces of the tension rods to hold the latter against the bridging member and to prevent movement of the bolt inside the sleeve.

MARTIN P. BLOMBERG.